United States Patent [19]

Palecek

[11] Patent Number: 5,121,455
[45] Date of Patent: Jun. 9, 1992

[54] FIBER OPTIC CONNECTOR

[75] Inventor: Vincent J. Palecek, Cicero, Ill.

[73] Assignee: Methode Electronics, Inc., Chicago, Ill.

[21] Appl. No.: 580,834

[22] Filed: Sep. 11, 1990

[51] Int. Cl.⁵ .............................. G02B 6/38
[52] U.S. Cl. ........................ 385/69; 385/66; 385/84; 385/86
[58] Field of Search ............ 350/96.20, 96.21, 96.22, 350/96.23; 385/60, 66, 69, 84, 86

[56] References Cited

U.S. PATENT DOCUMENTS

| | | | |
|---|---|---|---|
| 3,649,098 | 3/1972 | Suverison | 350/96.18 |
| 4,303,304 | 12/1981 | Ruiz | 350/96.20 |
| 4,362,356 | 12/1982 | Williams et al. | 350/96.20 |
| 4,534,616 | 8/1985 | Bowen et al. | 350/96.20 |
| 4,541,685 | 9/1985 | Anderson | 350/96.21 |
| 4,693,550 | 9/1987 | Brown et al. | 350/96.20 |
| 4,789,218 | 12/1988 | Paul et al. | 350/96.21 |
| 4,911,581 | 3/1990 | Miller | 350/96.20 |
| 4,961,624 | 10/1990 | Savitsky et al. | 350/96.20 |
| 5,054,879 | 10/1991 | Brown | 385/59 |

*Primary Examiner*—Brian Healy
*Attorney, Agent, or Firm*—Allegretti & Witcoff, Ltd.

[57] ABSTRACT

A fiber optic connector for terminating a length of fiber optic cable having a central fiber optic core covered by cladding. The connector preferably comprises a rigid, one-piece, integrally molded plastic sleeve for fitting over the end of the optic cable with an outermost end of said cable being typically stripped of all material outside of said cladding, and said outermost end projecting in snugly fitting relation through a bore in an outer end of the rigid sleeve. The bore also defines through the sleeve a section spaced from the outer end which is of increased diameter when compared with the bore at the outer end, to snugly receive a portion of the fiber optic cable having unstripped buffer. The rigid sleeve may carry side apertures for receiving a plurality of U-shaped retention members which pass transversely through the side apertures, preferably from a plurality of transverse directions, to grip and retain the fiber optic cable. Also a coupling ring is provided having an arcuate, diagonal slot that permits the system to be reliably used in the manner of a push-pull connector.

21 Claims, 2 Drawing Sheets

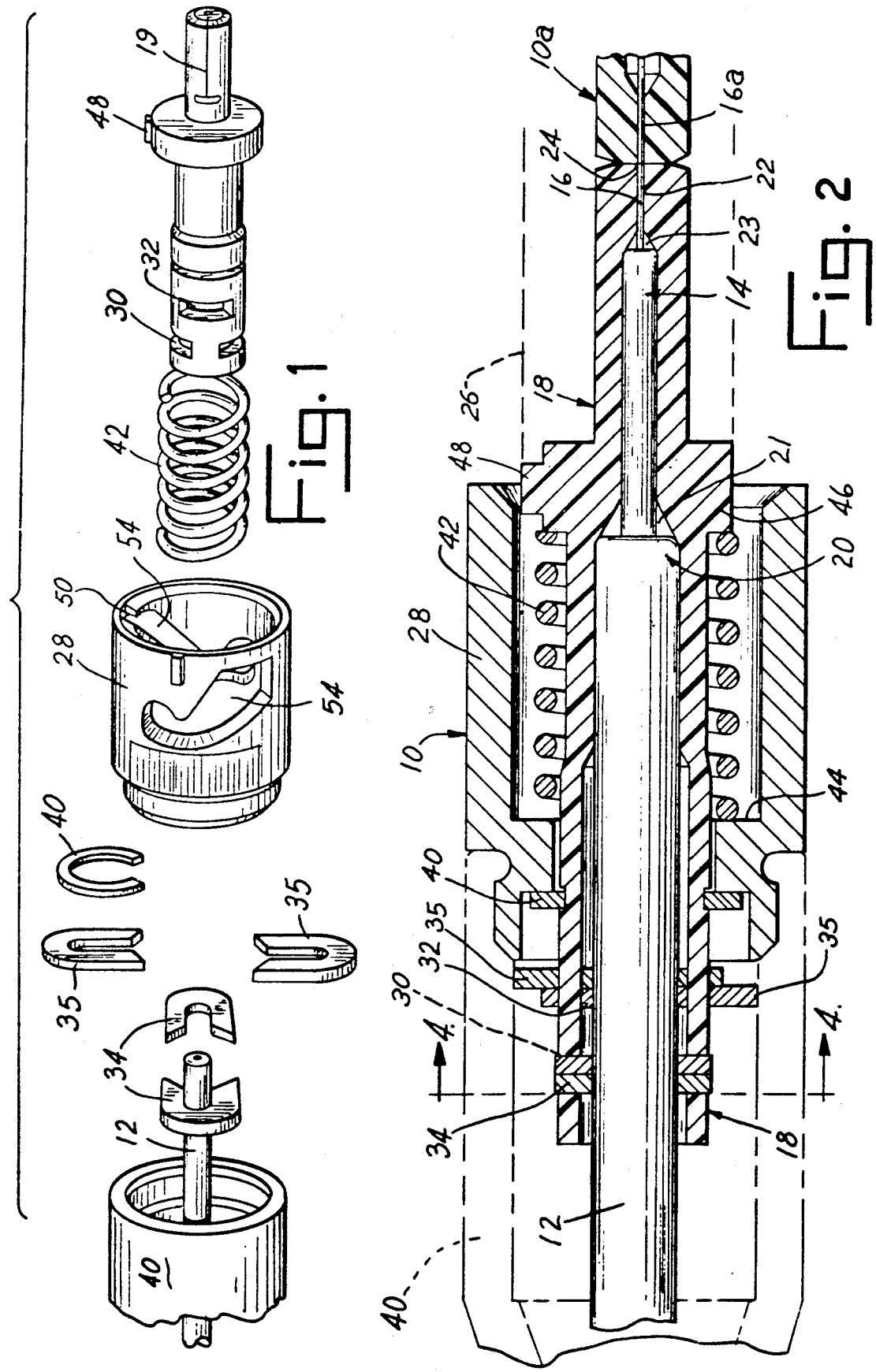

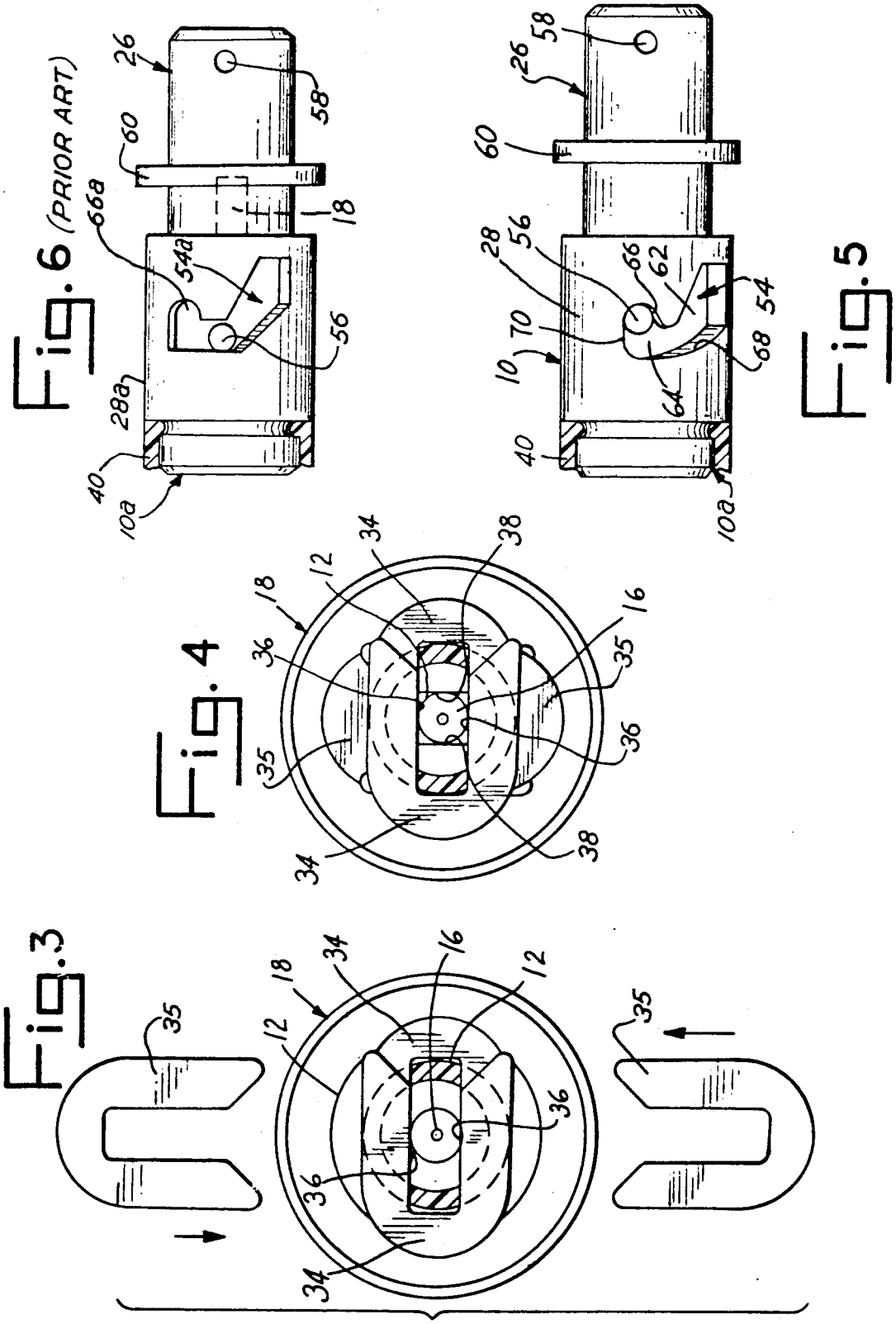

FIBER OPTIC CONNECTOR

BACKGROUND OF THE INVENTION

Fiber optic cable systems require connectors that hold separate fiber optic cables together with their ends in pressurized, abutting relation, such as Brown et al. U.S. Pat.No. 4,693,550 and Paul et al. U.S. Pat. No. 4,789,218. Another fiber optic cable system is disclosed by Anderson U.S. Pat. No. 4,541,685. Additionally, improvements in fiber optic connectors are disclosed in Brown U.S. patent application Ser. No. 506,296, filed Apr. 9, 1990, and entitled Push/Pull Fiber Optic Connector, now U.S. Pat. No. 5,054,879.

It is currently the general practice for the fiber optic connector to comprise a "backbone", which is a tubular, metal structure for holding the optic cable. At the front end of the backbone there is a bonded metal, plastic, or ceramic ferrule through which the stripped front end of the cable may extend in snug-fitting relation, so that as the ferrule is aligned with an abutting, facing ferrule, the optic cable ends can be exactly aligned, so that there is a low loss of optical signal due to misalignment.

The proper alignment of the abutting optic cable ends is a critical matter, and any improvements of dimensional reliability and the like which can cause the optic cable ends to be precisely aligned with greater accuracy and reliability provides improved performance of the overall optical transmission system.

By this invention, a more reliable optic cable connector is provided for terminating an optic cable system, in which certain inaccuracies which can come into the system due to inaccuracies of attachment of the plastic or ceramic ferrule to the metal backbone may be reduced or eliminated, while also a reduction in manufacturing costs can be provided.

Additionally, in the prior art, the optic cable is typically crimped into position in the metal "backbone". This crimping process can also cause some dimensional inaccuracies to take place, which can be transferred to contribute to inaccuracies in the connection between abutting optic cable ends. By this invention, a different system is provided for retention of optic cable within a backbone and ferrule, to provide greater accuracy of alignment.

Also, by this invention, a new connection system for the optic cable is provided, which exhibits greater connection reliability. Also, screw threaded connectors which result in the rotation of the optical cable ends can cause scratching and other damage as the rotating optic cable ends are brought into abutting relation with each other. By the invention of this application, the advantages of a push-pull connector can be provided, but with a desired amount of rotating action, for reliable, effective connection at a low cost.

DESCRIPTION OF THE INVENTION

In this invention, a fiber optic connector is provided for terminating a length of fiber optic cable having a central fiber optic core covered by cladding. At least a buffer is provided outside of the cladding, and typically other layers of protective coatings and insulation are provided, as is typical in conventional fiber optic cable.

In accordance with this invention, the fiber optic connector comprises a rigid, one-piece, integrally molded plastic sleeve for fitting over the end of the fiber optic cable. An outermost end of the cable is stripped of all material outside of the cladding, while the outermost end projects in snugly fitting relation through a bore in an outer end of the rigid sleeve. The bore of the rigid sleeve also extends entirely through the sleeve, to define a section spaced from the outer end which is of increased diameter over the bore at the outer end, to snugly receive a portion of the fiber optic cable having unstripped buffer. Also, means are provided for axial retention of the fiber optic cable in the rigid sleeve.

Preferably, the rigid, one-piece, integrally molded plastic sleeve defines side aperture means which are spaced along the bore section for receiving transversely movable, axial retention means for gripping and axially retaining the fiber optic cable in the sleeve. The transversely movable means may preferably comprise a plurality of U-shaped retention members extending through the side aperture means from a plurality of transverse directions to grip and retain the fiber optic cable.

If desired, the U-shaped retention members may have legs which define inner edges proportioned to penetrate the outermost material portions of the fiber optic cable for ripping retention thereof. Then, a protective boot may preferably surround the retention members mounted in the side aperture means, with the boot also surrounding at least a portion of the rigid sleeve. The boot serves to hold the U-shaped retention members in position, while the U-shaped retention members can also serve to frictionally retain the boot in its position.

While it is preferred to provide the side aperture means and U-shaped retention members to a rigid, one-piece, integrally molded plastic sleeve as described above, it is also possible for such an invention to be used in conjunction with conventional metal backbones of the prior art, which carry a ferrule at their forward ends. This provides a new technique for retaining the optic cable with longitudinal securance in such connectors, which may be otherwise conventional.

The connector of this invention, or any analogous fiber optic connector of the prior art, may carry a coupling ring in accordance with this invention which is the sleeve of this invention or other analogous prior art structure. The coupling ring defines connector slot means which, in turn, comprises a diagonal section to connect with a mating connector having a projection fitting in the slot, to cause relative rotation of the connectors by an axial load between them, with the relative rotation being impelled under such load by the diagonal direction of the slot means.

The slot means also defines a substantially circumferential section having a lateral recess for locking the projection, to prevent such relative rotation when the axial load is absent, because the projection occupies the lateral recess in that circumstance to prevent such rotation.

In accordance with this invention, the slot defines a concave, arcuate edge facing the axial load. As a result of this, projections positioned in the diagonal section ca be reliably and spontaneously moved by rotation into alignment with the lateral recess for such locking, when an axial load is imposed. Thus, such a system in accordance with this invention can exhibit both the advantages of a screw-type connector and a push-pull type connector, being inexpensively, reliably locked, with great simplicity.

The rigid, one-piece, integrally molded plastic sleeve may define a transverse flange, while the coupling ring may define an inner end face. Spring means are provided engaging the transverse flange and the inner end face, to resiliently urge the coupling ring away from the outer end of the sleeve, which coupling ring is adapted for limited, longitudinal motion on the sleeve. Thus, advantages of a longitudinally resilient, spring loaded connection are achieved, avoiding accidental, transient separation of the abutting, free optic cable ends during use.

The rigid, one-piece, integrally molded plastic sleeve 10 may be made of any desired, rigid plastic which is capable of holding good dimensional tolerance during the molding process and afterward. Particularly, it is preferred for the molded plastic sleeve to be made of an ABS (acrylonitrile-butadiene-styrene) plastic molding compound, with the plastic sleeve being plated with a metallic coating on the order of 0.001 to 0.004 inch thick, to provide added strengthening to the one-piece plastic sleeve. Specifically, the integrally molded plastic sleeve may be plated with a thin coating of a copper or nickel base adhering to the plastic. Then, by electrolytic plating, an outer layer of chromium or nickel, typically about 0.002 inch thick, can be provided.

DESCRIPTION OF DRAWINGS

In the drawings, is an exploded, perspective view of a fiber optic connector in accordance with this invention;

FIG. 2 is a longitudinal sectional view of the fiber optic connector of FIG. 1 in assembled form;

FIG. 3 is a transverse sectional view of the fiber optic connector of FIG. 2, showing partial assembly of the U-shaped retention members as the means for axial retention of fiber optic cable in the rigid sleeve;

FIG. 4 is a transverse sectional view similar to FIG. 3 showing the U-shaped retention members in their fully seated configuration;

FIG. 5 is an elevational view of the fiber optic connector of this invention, connected to a bulkhead coupler, showing the improvement in the coupling ring in accordance with this invention; and FIG. 6 is a representation of a prior art connection between a fiber optic connector and a bulkhead coupler, for providing connection between a pair of fiber optic connectors.

DESCRIPTION OF SPECIFIC EMBODIMENTS

Referring to the drawings, FIGS. 1 and 2 in particular show a fiber optic connector 10 for terminating a length of fiber optic cable 12, which is shown in FIG. 1 in unstripped form, and in FIG. 2 in its installed position, with the front end portion 14 being stripped of its buffer coating and all other outer layers, with the optic fiber 16 itself, and its cladding, comprising a distal end portion.

Connector 10 comprises a rigid, one-piece, integrally molded plastic sleeve 18, having a longitudinal bore 20 which surrounds the end of fiber optic cable 12 as shown. It can be seen that bore 20 comprises a series of sections of reducing diameter. The various portions of the cladding and other outer layers are progressively removed at Sections 21 and 23 so that the optic fiber 16 itself, typically stripped of essentially all material outside of the cladding, projects in snugly fitting relation through constricted bore portion 22 at the outer end of rigid plastic sleeve 18. The end of sleeve 18 may define a longitudinal split to facilitate alignment of optic fiber 16.

In the assembly process, the optic fiber and its cladding can project out of the front end 24 of bore 22, to be cleaved in conventional manner, to be made suitable for end-to-end, abutting connection with a similar optic cable 16a mounted in a similar connector 10a.

The respective connectors 10, 10a are mounted in their abutting, light transmitting relation within a conventional bulkhead coupler 26, with the respective connectors 10 being connected in end-abutting relation with each other, and locked to the bulkhead coupler 26 by connection through coupling rings 28 carried on the connector, to be described.

Means are provided to connector 10 for axial retention of fiber optic cable 12 in the rigid sleeve 18. Such means may include a plurality of side apertures 30, 32, spaced along sleeve 18 for receiving U-shaped retention members 34, 35 through the side apertures 30, 32, from two different perpendicular directions, to grip and retain fiber optic cable 12.

The details of this are particularly shown in the sectional views of FIGS. 3 and 4. As shown in FIG. 3, a first pair of opposed, U-shaped members 34 may be pushed through side aperture 30 from opposed directions, with the inner edges 36 of their legs being sharp enough to penetrate the outermost material portions of fiber optic cable 12, but insufficiently deep to interfere with the inner optic fiber 16 itself.

Then, the second set of U-shaped retention members 35 may be inserted through apertures 32 in opposed relation to each other, whereby the sharp, inner edges 38 of their legs also penetrate the outermost material portions of the fiber optic cable 12, for ripping retention thereof. Thus, when U-shaped members 34, 35 are applied, fiber optic cable 12 is firmly, longitudinally retained within rigid sleeve 18, without the need for crimping retention.

After these steps, protective boot 40 may be drawn up along cable 12 and positioned as shown in FIG. 2 to a relation to both protect the back portion of connector 10 and to retain the U-shaped retention members 34, 35 in their positions, so that they do not work their way out of retaining relation. At the same time, boot 40, being elastic, can be held in place on the back ends of the respective shaped members 34, 35, by frictional or resilient retention.

It can be seen that coupling ring 28 is carried on one-piece sleeve 18 in longitudinally restricted but optionally rotationally free relation, being retained in position by U-shaped keeper member 40 in the manner shown in FIG. 2. Spring 42 is provided, being positioned to press against an interior flange 44 of coupling ring 28 at one end, and a flange 46 carried by rigid sleeve 18 at its other end. Thus, coupling ring 28 may be slightly advanced under spring tension with respect to rigid sleeve 18, to provide a resilient mounting to the entire system that provides known advantages of better reliability and less transient separation under conditions of vibration or the like.

Projection 48 on flange 46 can fit into a corresponding slot 50 in coupling ring 28, to prevent relative rotation in its retracted position as shown, but to permit relative rotation for locking of the coupling ring when coupling ring 28 is advanced relative to sleeve 18 to compress spring 42, for locking action.

FIG. 5 shows connector 10 in accordance with this invention having its coupling ring 28 and showing one of opposed side slots 54, which are each proportioned to receive a projection or stud 56 which is carried by conventional bulkhead coupler 26, to which connector 10 is being locked. Another connector of the same design can be connected to the other side of bulkhead coupler 26, making use of the other projection 58 shown. Thus, a reliable connection can be made between the respective connectors, with the connector ends being held by bulkhead coupler 26 in the desired, abutting relation, with the respective optic cables 16, 16a being in exact, dimensionally precise, abutting and registering relation for the maximum transmission of light across the junction between them. The abutting sleeves 18 may be of a length to cause some compression of their springs 42, to provide a resilient mounting.

Retention flange 60 may then carry aperture means or the like for securance to a bulkhead, for positioning.

Connector slot 54 comprises a diagonal section 62 to receive a locking projection 56 of the mating bulkhead coupler or connector 26.

Slot 54 also defines a substantially circumferential section 64 which, in turn, defines a lateral recess 66 for locking projection 56. The effect of this is to prevent relative rotation between coupling ring 28 and bulkhead coupler 26 when an axial load is absent, so that the system is in about the configuration of FIG. 5. However, when coupling ring 28 is sufficiently advanced with respect to rigid sleeve 18, compressing spring 42, it becomes possible to rotate the coupling sleeve with respect to the bulkhead coupler 26.

In accordance with this invention, slot 54 defines a concave, arcuate edge 68 facing the axial load. This curved edge extends along the majority of the length of slot 54, typically passing along both diagonal section 62 and circumferential section 64. Thus, when coupling is taking place between members 26 and 28, projection 56 is first placed in the diagonal section 64 of slot 54. Then, one simply pushes coupler member 28 and bulkhead coupler 26 toward each other. The curved edge 68 of slot 54 drives projection 56 inwardly of the slot all the way to a seated position at the inner end 70 in circumferential section 64, by impelling spontaneous relative rotation between the two parts 26, 28. Then, upon at least partial release of the tension of spring 42, coupler 28 retracts, putting projection 56 into narrow recess 66 to lock the system.

It can be seen that this happens spontaneously, so that the connector behaves like a push-pull connector, in which a push will cause spontaneous rotation of the respective connectors into locked configuration, upon release of the push. This avoids the problem illustrated in the prior art situation of FIG. 6, in which a prior art coupling ring 28a, carried on a connector 10a, is placed into connection with the bulkhead coupler 26. Because slot 54a has no curved walls similar to wall 68, it is possible upon push-connection for the system to be incompletely locked as shown, with projection 56 of coupler 26 being incompletely seated and not engaged in lateral recess 66a. Thus, the system is more likely to become accidentally disconnected than in the situation of this present invention, where a simple push connection can provide reliable and complete locking because of the curved surface 68, which spontaneously causes relative rotation, and drives slot 54 and projection 56 into their desired relationship as shown in FIG. 5, rather than into only the unstable relationship illustrated in FIG. 6 of the prior art.

Preferably, rigid, one-piece, integrally molded plastic sleeve 18 may be made of ABS plastic, with its exterior plated with chrome or nickel as previously described. Coupling ring 28 may also be made of ABS plastic, or any other desired plastic. Alternatively, other plastics which may be useful for the manufacture of rigid sleeve 18 and coupling ring 28 include rigid polyesters such as Valox 420 SEO by General Electric, and other plastics such as General Electric Ultem, and Vectra-LCP by Imperial Chemicals Limited.

Accordingly, an improved optical connector is provided in accordance with this invention, exhibiting significant advantages over prior art systems, the improved features of which may be used together or separately as desired. The connector may be free of crimping, which serves as a source of inaccuracy of orientation, which can result in less accurate connection between the optic cable ends 16. More reliable connection is provided with a new system for coupling with the bulkhead coupler in a more reliable manner. Additionally, the rigid, one-piece, integrally molded plastic sleeve eliminates the need in the prior art of the connection of a separate ferrule at the front end of the sleeve with a metal back end of the sleeve. This prior art connection can result in radial inaccuracy, which also can reduce the light transmission efficiency of the connector.

The above has been offered for illustrative purposes only, and is not intended to limit the scope of the invention of this application, which is as defined in the claims below.

That which is claimed is:

1. A fiber optic connector for terminating a length of fiber optic cable having a central fiber optic core covered by cladding, and at least a buffer outside of the cladding, said connector comprising a rigid, one-piece, integrally molded plastic sleeve for fitting over the end of the fiber optic cable with an outermost end of said cable being stripped of essentially all material outside of said cladding, and said outermost end projecting in snugly fitting relation through a bore in an outer end of said rigid sleeve, said bore also extending through said sleeve and defining a section spaced from said outer end which is of increased diameter over said bore at the outer end, to snugly receive a portion of said fiber optic cable having unstripped buffer; and means for axial retention of said fiber optic cable in said rigid sleeve.

2. The fiber optic connector of claim 1 in which said rigid, one piece, integrally molded plastic sleeve defines side aperture means spaced along said bore section for receiving transversely movable axial retention means for gripping and axially retaining said fiber optic cable in said sleeve.

3. The fiber optic connector of claim 2 in which said transversely movable means comprises a plurality of U-shaped retention members extending through said side aperture means from a plurality of transverse directions to grip and retain said fiber optic cable.

4. The fiber optic connector of claim 3 in which said U-shaped retention members have legs defining inner edges proportioned to penetrate the outermost material portions of said fiber optic cable for gripping retention thereof.

5. The fiber optic connector of claim 3 which includes a protective boot surrounding said retention members mounted in the side aperture means and at least a portion of said rigid sleeve.

6. The fiber optic connector of claim 1, carried on the end of a length of said fiber optic cable.

7. The fiber optic connector of claim 1, in which a coupling ring is carried on said rigid, one-piece, integrally molded plastic sleeve.

8. The fiber optic connector of claim 7 in which said coupling ring defines connector slot means comprising a diagonal section to connect with a mating connector having a projection fitting in said slot means to cause relative rotation of said connectors by an axial load between them, said slot means also defining a substantially circumferential section having a lateral recess for locking said projection, to prevent said relative rotation when said axial load is absent, said slot means defining a concave, arcuate edge facing said axial load, whereby said projection positioned in said diagonal section can be reliably and spontaneously moved by rotation into alignment with said lateral recess for said locking by application of said axial load.

9. The fiber optic connector of claim 7 in which spring means engages said coupling ring, to resiliently urge said coupling ring away from the outer end of said sleeve, said coupling ring being longitudinally movable on said rigid sleeve.

10. The fiber optic connector of claim 1 in which said rigid, one-piece, integrally molded plastic sleeve is made of a ABS molding compound which carries exterior metal plating having a thickness of 0.001 to 0.004 inch.

11. A fiber optic connector terminating a length of fiber optic cable having a central fiber optic core covered by cladding, and at least a buffer outside of the cladding, said connector comprising a rigid, one-piece, integrally molded plastic sleeve fitting over the end of the fiber optic cable with an outermost end of the cable being stripped of all material outside of said cladding, and said outermost end projecting in snugly fitting relation through a bore in an outer end of said rigid sleeve, said bore also extending through said sleeve and defining a bore section spaced from said outer end which is of increased diameter over said bore at the outer end to snugly receive a portion of said fiber optic cable having unstripped buffer;

means for axial retention of said fiber optic cable in said rigid sleeve, said rigid sleeve defining, as part of said axial retention means, side aperture means spaced along said bore section for receiving transversely movable axial retention mean for gripping and axially retaining said fiber optic cable in said sleeve;

and a coupling ring carried on said rigid plastic sleeve in longitudinally fixed, rotatably movable relation with said sleeve, said coupling ring defining connector slot means comprising a diagonal section to connect with a mating connector having a projection fitting in said slot means, to cause relative rotation of the connectors by an axial load between them, said slot means also defining a substantially circumferential section having a lateral recess for locking said projection, to prevent said relative rotation when said axial load is absent, said slot means defining a concave, arcuate edge facing said axial load, whereby said projection positioned in said diagonal section can be reliably and spontaneously moved by rotation into alignment with said lateral recess for said locking by application of said axial load.

12. The fiber optic connector of claim 11 in which said transversely movable, axial retention means comprises a plurality of U-shaped retention members extending through said side aperture means from a plurality of transverse directions to grip and retain said fiber optic cable.

13. The fiber optic connector of claim 12 in which said U-shaped retention members have legs defining inner edges proportioned to penetrate the outermost material portion of said fiber optic cable for gripping retention thereof.

14. The fiber optic connector of claim 13 which includes a protective boot surrounding said retention members mounted in the side aperture means and at least a portion of said sleeve.

15. A fiber optic connector terminating a length of fiber optic cable having a central fiber optic core, said connector comprising a rigid sleeve fitting over the end of the fiber optic cable, with an outermost end of said cable projecting in snugly fitting relation through a bore in an outer end of said rigid sleeve, in which said rigid sleeve defines side aperture means spaced along a bore section, said aperture means receiving transversely movable axial retention means for gripping and axially retaining said fiber optic cable in said sleeve.

16. The fiber optic connector of claim 15 in which said transversely movable axial retention means comprises a plurality of U-shaped retention members extending through said side aperture means from a plurality of transverse directions to grip and retain said fiber optic cable.

17. The fiber optic connector of claim 16 in which said U-shaped retention members have legs defining inner edges proportioned to penetrate the outermost material portions of said fiber optic cable for gripping retention thereof.

18. The fiber optic connector of claim 17 which includes a protective boot surrounding said retention members mounted in the side aperture means and at least a portion of said sleeve.

19. A fiber optic connector for terminating a length of fiber optic cable having a central fiber optic core covered by cladding, said connector comprising a rigid sleeve for fitting over the end of said fiber optic cable, a coupling ring carried on said rigid sleeve, said coupling ring defining connector slot means comprising a diagonal section to connect with a mating connector having a projection fitting in said slot means, to cause relative rotation of said connectors by an axial load between them, said slot means also defining a substantially circumferential section having a lateral recess for locking said projection to prevent said relative rotation when said axial load is absent, said slot defining a concave, arcuate edge facing said axial load, whereby said projection positioned in said diagonal section can be reliably and spontaneously moved by rotation into alignment with said lateral recess for said locking by application of said axial load.

20. The fiber optic connector of claim 19 in which spring means are present engaging said rigid sleeve and said coupling ring, to resiliently urge said coupling ring away from the outer end of said sleeve, said coupling ring being capable of limited longitudinal motion relative to said sleeve.

21. The fiber optic connector of claim 20 in which said rigid sleeve is a made of one-piece, integrally molded ABS plastic, said rigid sleeve carrying exterior metal plating of a thickness of 0.001 to 0.004 inch.

* * * * *